United States Patent [19]

Ishizaki et al.

[11] Patent Number: 4,760,418
[45] Date of Patent: Jul. 26, 1988

[54] FLASH PHOTOGRAPHING SYSTEM

[75] Inventors: Akira Ishizaki; Yasuo Suda, both of Yokohama, Japan

[73] Assignee: Canon Kabushiki Kaisha, Tokyo, Japan

[21] Appl. No.: 907,856

[22] Filed: Sep. 15, 1986

[30] Foreign Application Priority Data

Sep. 19, 1985 [JP] Japan .................. 60-207031

[51] Int. Cl.[4] .................. G03B 3/00; G03B 15/05
[52] U.S. Cl. .................. 354/403; 354/415; 354/416; 354/432
[58] Field of Search .................. 354/402–409, 354/415, 416, 417, 429, 431, 432, 145.1

[56] References Cited

U.S. PATENT DOCUMENTS

| Re. 31,370 | 9/1983 | Mashimo et al. | 354/402 X |
| 3,868,701 | 2/1975 | Kawasaki | 354/415 |
| 3,930,184 | 12/1975 | Biber et al. | 354/145.1 X |
| 4,423,936 | 1/1984 | Johnson | 354/432 X |
| 4,429,966 | 2/1984 | Hosoe et al. | 354/406 |
| 4,527,880 | 7/1985 | Okino | 354/417 X |
| 4,618,235 | 10/1986 | Ishida et al. | 354/415 X |
| 4,642,451 | 2/1987 | Tsunekawa et al. | 354/403 X |

FOREIGN PATENT DOCUMENTS

138729  10/1981  Japan .................. 354/415

Primary Examiner—W. B. Perkey
Attorney, Agent, or Firm—Robin, Blecker & Daley

[57] ABSTRACT

A flash photographing system which comprises a camera equipped with an AF device and a flash device is arranged to control the flashing light quantity of the flash device by utilizing the AF sensor of the AF device in a flash photographing mode.

7 Claims, 5 Drawing Sheets

FLASH PHOTOGRAPHING SYSTEM

BACKGROUND OF THE INVENTION

1. Field of the Invention

This invention relates to a flash photographing system having a TTL automatic focusing device and more particularly to a system of the kind arranged to make pre-flashing and to control a main flashing light quantity on the basis of information resulting from the pre-flashing.

2. Description of the Related Art

There has been known a camera system arranged to make pre-flashing; to detect, through the lens of the camera (TTL), a reflection light reflected by an object to be photographed as a result of pre-flashing by means of a photosensitive element disposed within the camera; and to determine a main flashing light quantity according to the result of the detection. If such a flashing quantity controlling type camera system is equipped with an AF device, the camera must be provided with a light receiving sensor for an AF operation as well as a light receiving sensor for flash light quantity control. Both of these light receiving parts then must be arranged to measure mainly a light flux incident on the middle part of a view finder. This arrangement causes a considerable portion of a light flux coming through the lens of the camera to be guided to these light receiving parts. As a result, the view finder becomes dark.

This problem also has likewise affected a case where an AF system is provided on the so-called TTL type flash light quantity controlling camera which is arranged to control flashing light quantity by receiving a light reflected from a film surface as a result of flashing.

SUMMARY OF THE INVENTION

It is an object of this invention to provide a flash photographing system which solves the abovestated problem by arranging an AF sensor to perform a combined function as a flashing light quantity controlling sensor in such a way as to obviate the necessity of separately arranging two sensors for the AF operation and flashing light quantity control.

Further objects and features of this invention will become apparent from the following detailed description of a preferred embodiment thereof taken in connection with the accompanying drawings.

DETAILED DESCRIPTION OF THE PREFERRED EMBODIMENT

Figure 1:
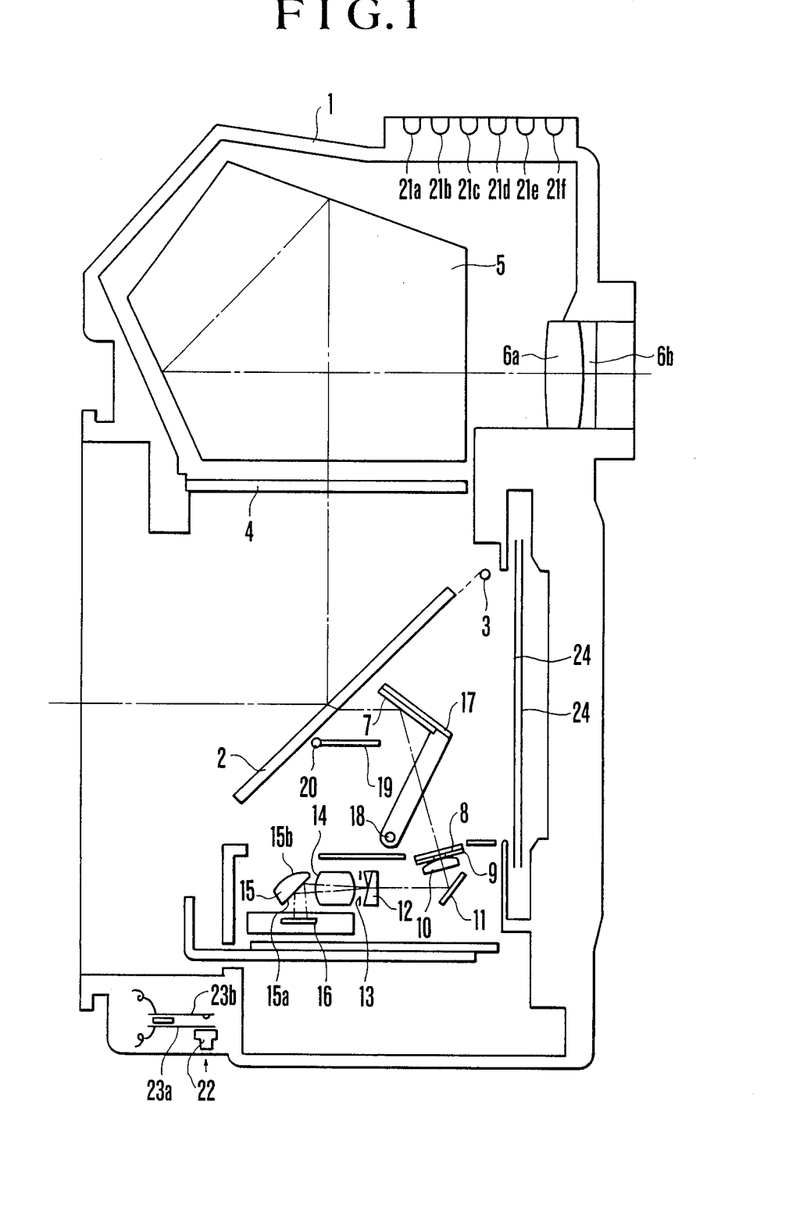
FIGS. 1 and 2 are schematic views respectively showing the arrangement of a camera to be included in a flash photographing system embodying this invention.
Figure 2:
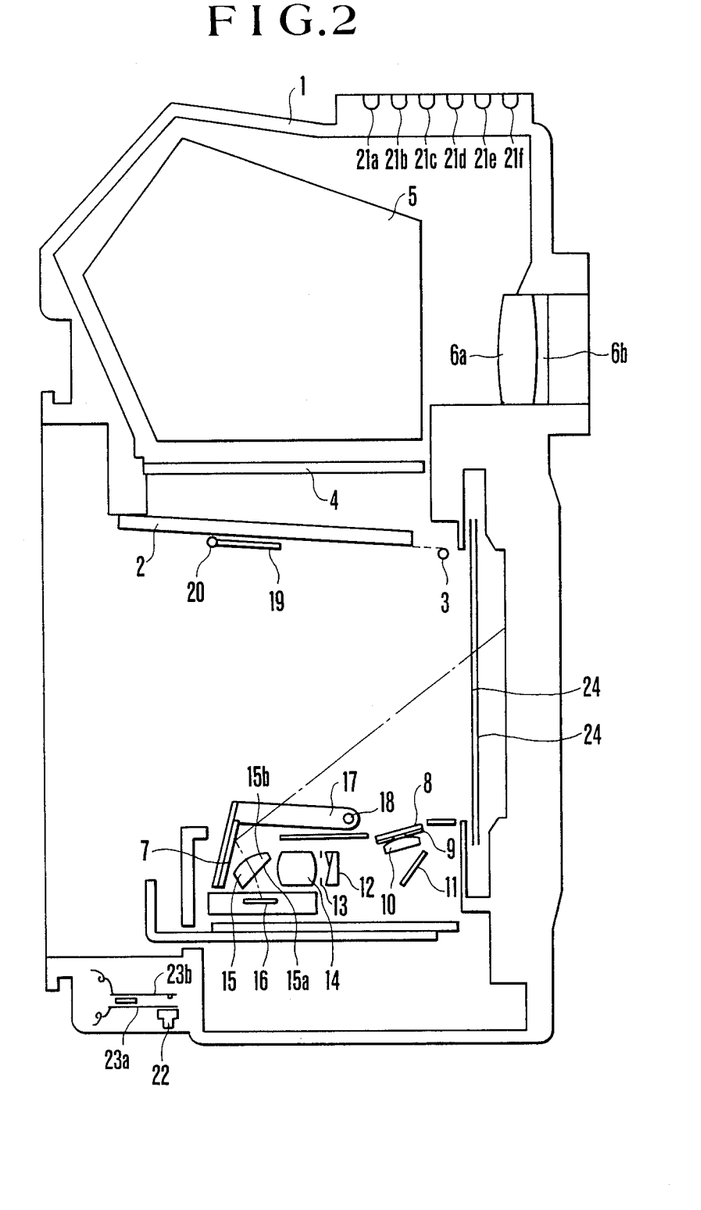

A flash photographing apparatus embodying this invention is arranged by way of example as described below with reference to FIGS. 1 to 5, wherein:

FIGS. 1 and 2 show the arrangement of a flash light measuring device. The illustration includes a camera body 1; a main mirror 2 which is arranged to guide a light flux coming through a photo-taking lens (not shown) to a view finder optical system; a rotating shaft 3 of the main mirror 2; a focusing screen 4; a pentagonal prism 5; and an eyepiece 6a and 6b. The middle part of the main mirror 2 is a half-reflection mirror which is arranged to have a transmission factor of about 30% for the purpose of dividing the light flux to a focus detecting optical system disposed in the bottom part of a mirror box. The light flux which has passed through this part is deflected downward by a sub-mirror 7 before it comes to a flash light measuring device. The flash light measuring device consists of elements 8 to 16 including an infrared ray cut filter 8; a visual field mask 9, a field lens 10, a mirror 11, an image separating prism 12, a stop 13, a re-imaging lens 14, a light deflecting member 15 having a half-reflection mirror part 15a and a lens part 15b; and a CCD sensor 16 which is arranged to integrate or accumulate the quantity of incident light. A sub-mirror receiving plate 17 is arranged to carry the sub-mirror 7 and to be turnable on a rotation shaft 18. A light shielding plate 19 is arranged to prevent a reverse incident light coming from the view finder optical system to the CCD sensor 16 via the half-reflection mirror part of the main mirror 2. The plate 19 is provided with a rotation shaft 20. There are provided contact points 21a–21f; a flash exposure lock button 22; electrical contact pieces 23a and 23b; and a shutter 24.

Figure 3:
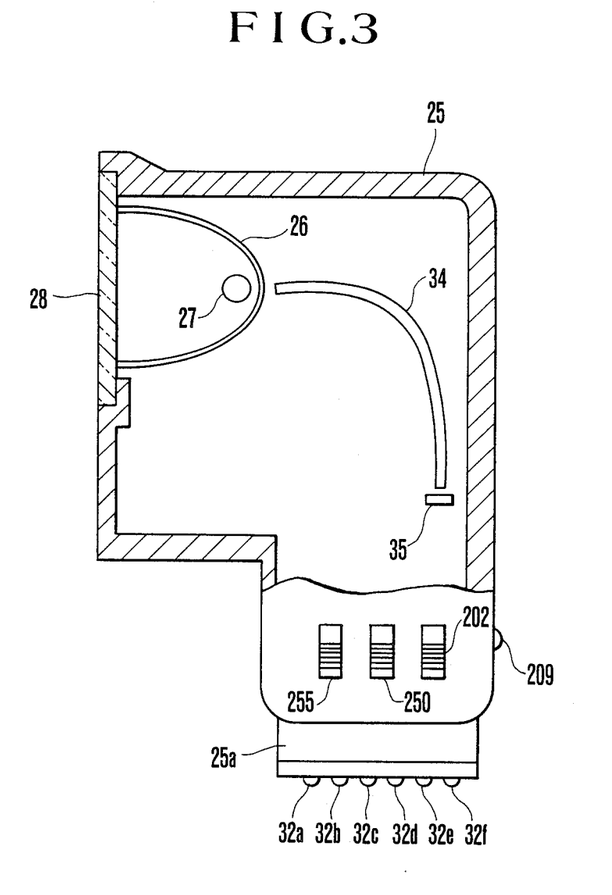
FIG. 3 is a partial sectional view showing the arrangement of a flash device to be included in the flash photographing system embodying this invention.

FIG. 3 shows the arrangement of a flash device to be mounted on the camera body of FIGS. 1 and 2. A reference numeral 25 denotes the body of the flash device. Within the flash device body 25, there are provided a flash photographing main discharge tube or lamp 27 which is secured to a reflection shade 26; a light guide 34 which is arranged to receive light coming from the discharge tube 27 through an aperture provided in the reflection shade; and a light receiving element 35. The body 25 is provided with a protection panel 28 which is made of an acrylic resin material; a charge completion display LED 209; a power supply switch 202; a synchronizing mode selection switch 250; and a light control mode selection switch 255. Further, contact points 32a to 32f are arranged at a camera connecting part 25a in the lower part of the body 25 to be electrically coupled with the corresponding contact points 21a to 21f of the camera body 1. Among these contact points, when the level of the contact point or terminal 32b changes from a high level to a low level, a pre-flashing process begins. Then, when it changes from the low level to the high level, a light quantity integrating process within the flash device comes to a stop and an integrated value of light quantity is stored.

The camera body 1 which is arranged as described above operates as follows: Under a condition before photo-taking with the main mirror 2 in a lowered position as shown in FIG. 1, the light flux which has passed through the photo-taking lens is split by the main mirror 2 into a light flux for the view finder optical system and another light flux for the flash light measuring system. The latter light flux which has passed through the main mirror 2 is deflected by the sub-mirror 7 obliquely backward to be incident upon the flash light measuring device. This flash light measuring device is arranged to serve also as a focus detecting device of the so-called phase difference detecting type. The device functions as the focus detecting device when it is not performing the flash light measuring operation. The details of the focus detecting operation of this device are disclosed for example in Japanese Patent Application No. Sho 59-191158, etc. and, therefore, are omitted in the following description. When the flash device body 25 is mounted on the upper part of the camera body 1, the contact points 32a to 32f of the flash device are electrically connected to the contact points 21a to 21f of the camera. Then, with the flash exposure lock button 22 operated, a flash photographing operation can be performed by adjusting an exposure level to a desired object to be photographed.

The term "flash exposure lock" as used herein means the following photographing method: Generally, the light measuring element (or photosensitive element) to be used for flash-light measurement is set to have a maximum sensitivity for the middle part of a photographing image plane. An apposite exposure, therefore, can be made when a main object to be photographed is located in the middle part of an image plane. However, the exposure becomes inapposite when the main object is located somewhere not in the middle part. To solve this problem, the flash device is arranged to make pre-flashing at a small light quantity with the main object temporarily placed in the middle part of an image plane. A light flux reflected by the object as a result of the preflashing is received by the CCD sensor 16 via the submirror 7, the field lens 10, the secondary imaging lens 14, etc. and thus a light quantity for main flashing is predetermined. After that, framing is accomplished with the main object placed in a desired part within an image plane before main flashing. Then, the flash light quantity for main flashing is controlled on the basis of the light quantity determined by the pre-flashing operation.

FIG. 2 shows the main mirror as in an uplifted state thus permitting a photo-taking operation. The operation of the embodiment under this condition is as follows: When a shutter release button which is not shown is pushed to an extent of the second stroke position thereof, the main mirror 2 is moved upward. Then, concurrently with closing of the light shielding plate 19, the stop or diaphragm of the photo-taking lens which is not shown is stopped down to a predetermined aperture value position. The sub-mirror receiving plate 17 turns round counterclockwise to be set in a position as shown in FIG. 2. The embodiment is provided with a driving device which is arranged to drive the receiving plate 17 in a manner as disclosed in Japanese Laid-Open Patent Application No. Sho 57-114130. Following that, the shutter 24 travels. With a flash device mounted on the camera, if the flash exposure lock botton 22 has been pushed before photographing, the flash light quantity of the flash device is controlled according to a light quantity predetermined in the lock mode described above. If the flash exposure lock button 22 has not been pushed before photographing, a reflection light reflected by the film surface comes to the CCD sensor 16 via the submirror 7 and the lens part 15b of the light deflecting member 15. In that instance, the light quantity is automatically controlled according to the reflection light coming from the film surface.

Figure 4:
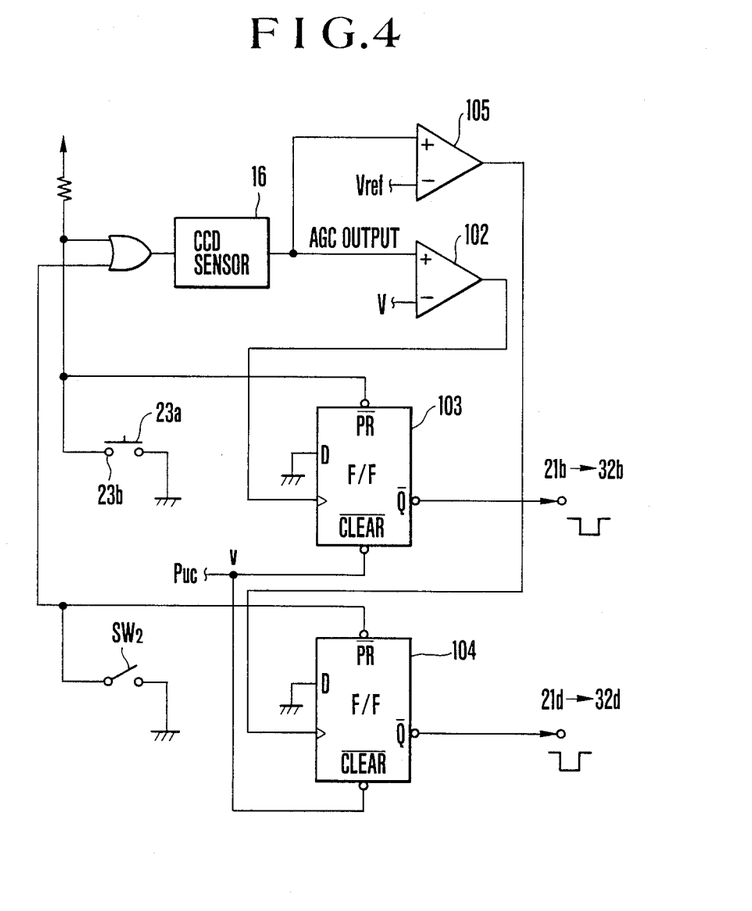
FIG. 4 is a circuit diagram showing a flash light measuring circuit included in the camera of FIG. 1.

FIG. 4 is a circuit diagram showing the circuit arrangement of the flash light measuring device of FIGS. 1 and 2. Comparators 102 and 105 are arranged to have reference level voltages V and Vref (Vref>V) applied to their negative input terminals respectively and the output AGC of the CCD sensor 16 (an output corresponding to the light quantity integrated by the sensor) applied to their positive input terminals.

D-type flip-flops 103 and 104 have their D inputs grounded. A power-up-clear circuit which is not shown is arranged to apply a power-up-clear signal PUC to the clear terminals $\overline{CLEAR}$ of these D-type filp-flops 103 and 104 when a power supply is switched on. The clock terminal of the flip-flop 103 is connected to the output terminal of the comparator 102. The clock terminal of the flip-flop 104 is connected to the output terminal of the comparator 105. Each of the flip-flops 103 and 104 is cleared by the power-up-clear signal PUC and produces a $\overline{Q}$ output at a high level when the power supply is switched on.

When the lock button 22 which is mentioned in the foregoing is pushed down, a switch (23a and 23b) of the circuit arrangement turns on. With the switch turned on, a signal is applied to the preset terminal $\overline{PR}$ of the flip-flop 103. The level of the $\overline{Q}$ output of the flip-flop 103 then shifts from a high level to a low level to transmit the above-stated signal via a terminal 21b to to the terminal 32b of the flash device. The signal then causes the flash device to begin preflashing. Meanwhile, in response to the turning on of the switch (23a and 23b), the CCD sensor 16 also begins its light quantity integrating action. When the output AGC which represents the integrating amount of the sensor 16 comes to exceed the reference level V, the output level of the comparator 102 becomes high. Then, the level of the $\overline{Q}$ output of the flip-flop 103 changes from a low level to a high level. The high level $\overline{Q}$ output is transmitted via the terminals 21b and 32b to the flash device to inhibit a pre-flashing light quantity integrating action which will be described later.

In case that the shutter release button is operated to the second stroke position thereof without pushing the lock button 22 and a switch SW2 is thus turned on, the flip-flop 104 is preset. The level of the $\overline{Q}$ output of the flip-flop 104 is shifted from a high level to a low level. The low level signal thus obtained is transmitted via terminals 21d and 32d to the flash device. This signal and an X contact ON signal of the camera jointly cause the flash device to begin main flashing. When the output AGC of the sensor 16 comes to exceed the reference level Vref, the comparator 104 produces an output to change the level of the $\overline{Q}$ output of the flip-flop 104 from a low level to a high level. The high level signal thus obtained is transmitted to the flash device to bring its main flashing action to a stop. The circuit shown in FIG. 4 thus functions as a flashing control circuit which controls the flash light quantity of the pre-flashing action and that of the main flashing action performed under a TTL light control condition.

Figure 5:
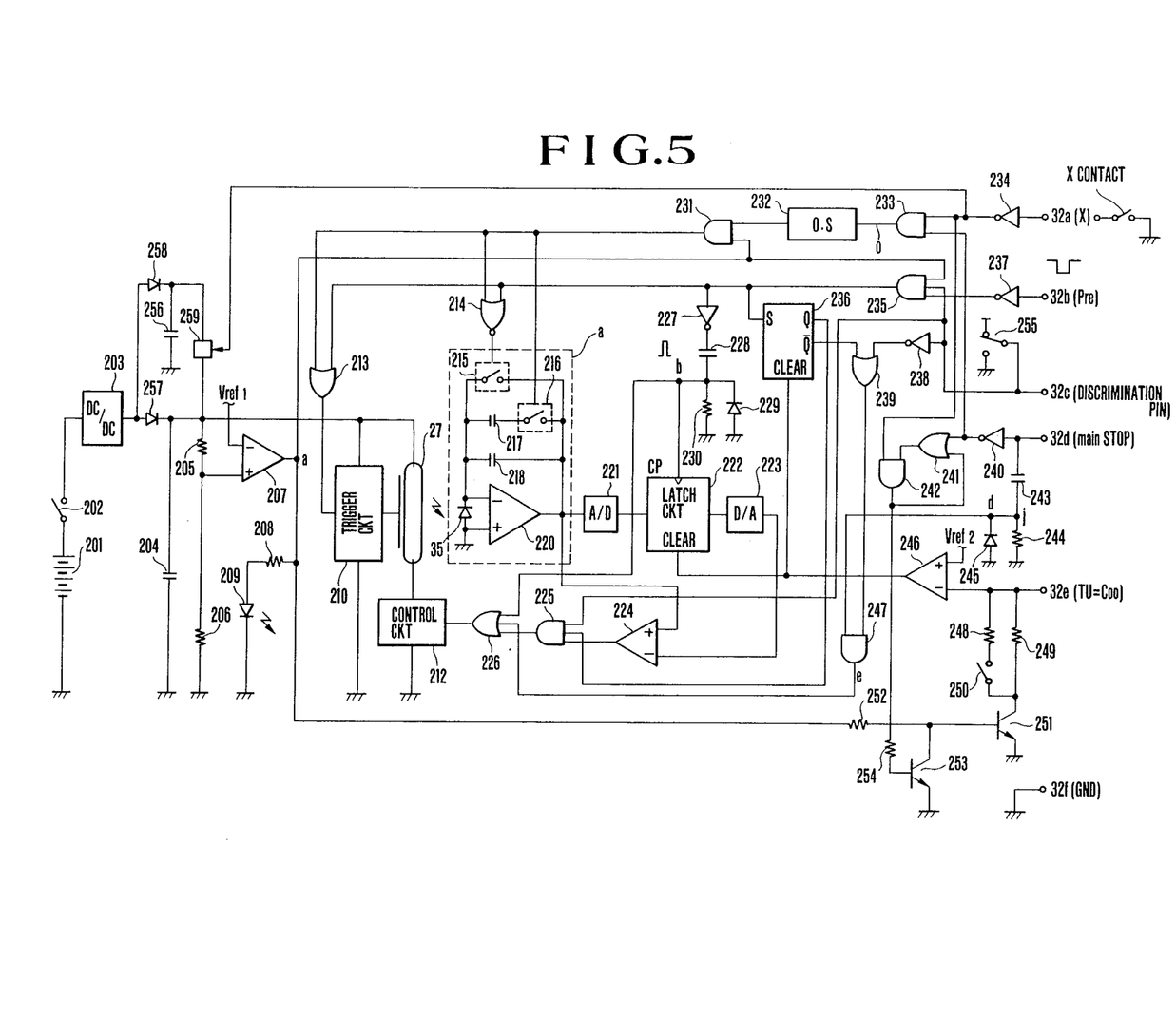
FIG. 5 is a circuit diagram showing a control circuit included in the flash device of FIG. 3.

FIG. 5 shows the circuit arrangement of the flash device shown in FIG. 3. The illustration includes a battery 201 which is connected in series to a power supply switch 202; a DC-to-DC converter 203 which boosts the voltage of the power source battery; a capacitor 204 which is arranged to accumulate energy for preflashing and to be of a capacity smaller than that of another capacitor 256; resistors 205 and 206 which are arranged to bleed the voltage of the capacitor 204; a comparator 207 which is arranged to detect completion of a charging process on the capacitor 204; a charge completion display LED 209 which has a resistor 208 connected in series thereto; a trigger circuit 210 which is arranged to cause a xenon discharge lamp 27 to begin to flash; a control circuit 212 which is arranged in a known manner to serially perform light control; an OR gate 213; a NOR gate 214; switches 215 and 216 which are composed of FET's, etc. and are arranged to be OFF when a control signal is at a low level and to be ON when the control signal is at a high level; a photo diode 35 which is arranged to detect the amount of light emitted from the xenon discharge lamp 27 and is disposed in a position as shown in FIG. 3; capacitors 217 and 218 and an operational amplifier 220 which form a known photo integrating circuit "a"; a known A/D converter 221 which consists of a plurality of comparators connected in parallel with each other; a latch circuit 222; a D/A converter 223; a comparator 224 which is arranged to compare the output of the photo integrating circuit "a" with that of the D/A converter 223; an AND gate 225; an OR gate 226; an inverter 227; a capacitor 228; a diode 229; a resistor 230 which is arranged to form a differentiation circuit together with the circuit elements 228 and 229; an AND gate 231; a monostable multivibrator 232 (hereinafter referred to as one-shot OS); an AND gate 233; an inverter 234; an AND gate 235; an RS flip-flop (F/F) 236 which has a clearing function and is arranged to be set by a pre-flashing starting signal when the signal is supplied thereto from a terminal 32b; inverters 237, 238 and 240; OR gates 239 and 241; AND gates 242 and 247; a capacitor 243, a resistor 244 and a diode 245 which are arranged to form a differentiation circuit similar to the circuit formed jointly by the above-stated capacitor 228, the resistor 230 and the diode 229; a comparator 246 which is arranged to detect whether a voltage is applied to a terminal 32e; resistors 248 and 249 which are arranged to determine the amount of a current to be supplied via the terminal 32e to the flash device; and a switch 250 which is arranged to shift the camera between a leading shutter curtain synchronizing mode and a trailing shutter curtain synchronizing mode by shifting its connection with the resistor 248. The leading curtain synchronizing mode is selected when this switch 250 is in an OFF state while the trailing curtain synchronizing mode is selected when the switch is in an ON state. The illustration further includes a transistor 251 which turns on when the output level of the comparator 207 becomes high indicating completion of a charging process; resistors 252 and 254; a transistor 253 which is arranged to turn off the above-stated transistor 251; a mode change-over switch 255 which is arranged to effect change-over between a flash exposure lock mode (hereinafter referred to as EFLK mode) and a TTL light control mode; and a capacitor 256 which is arranged to have a larger capacity than the pre-flashing energy accumulating capacitor 204 and to accumulate energy for main flashing, the capacity of the capacitor 256 being determined according to a ratio between pre-flashing and main flashing. In other words, if the flash light quantity of pre-flashing is arranged to be 1/N of that of main flashing, the capacity of the capacitor 204 is arranged to be 1/N of the sum of the capacity of the capacitor 204 and that of the capacitor 256. Therefore, assuming that the amount of pre-flashing is arranged to be 1/10 of that of main flashing, the capacity of the capacitor 204 is set at a value which is 1/9 of the capacity of the capacitor 256. Diodes 257 and 258 are arranged to prevent a reverse current flow. A switching element 259 is arranged to turn on when the output level of the inverter 234 becomes high, i.e. when the X contact on the side of the camera turns on, and to turn off when the output level of the inverter becomes low. With the switching element 259 arranged in this manner, flashing is performed with the energy accumulated at the capacitor 204 during the pre-flashing process and with the energy accumulated at the capacitors 204 and 256 during the main flashing process.

The capacities of the capacitors 217 and 218 of the photo integrating circuit "a" are also arranged in the same manner as the capacity ratio between the above-stated capacitors 204 and 256. Terminals 32a to 32f are provided for connection with the camera. The terminal 32a is the X contact. The terminal 32b is arranged to receive from the camera a signal which controls the start and end of the pre-flashing process. The flash device begins to perform pre-flashing when the level of this signal changes from a high level to a low level. The pre-flashing comes to an end when the level of this signal changes from the low level to the high level. The terminal 32c is used for transmitting a signal indicative of a photographing mode set at the flash device to the camera. There obtains the EFLK mode when the signal is at a high level and the TTL light control mode when the signal is at a low level. The terminal 32d is arranged to prevent the flash device from flashing after receipt of a high level signal until the signal changes to a low level even if in the meantime the level of the signal of the X contact changes from a high level to a low level. In the case of the TTL light control mode, flashing by the flash device is brought to a stop when the signal supplied to the terminal 32d changes from a low level to a high level. The terminal 32e is arranged to receive a constant voltage applied to the flash device from the camera. The selection of the leading shutter curtain synchronizing mode or the trailing shutter curtain synchronizing mode of the camera is determined by the amount of a current flowing to this terminal 32e. Another terminal 32f is provided for grounding. The flash device which is arranged as described above operates in the following manner:

First, let us assume that the terminal 32c is at a high level with the EFLK mode selected by the switch 255 and that the leading shutter curtain synchronizing mode is selected with the switch 250 being in an OFF position. When the switch 202 turns on and the voltage of the capacitor 204 is raised by the DC-to-DC converter 203 under this condition, the output level of the comparator 207 changes from a low level to a high level. This causes the LED 209 to light up and the transistor 251 to turn on. After that, when the shutter release button of the camera is pushed to an extent of a first stroke thereof, a switch of the camera which is not shown turns on to have a constant voltage applied to the terminal 32e. A prescribed amount of current then flows to the resistor 249. Since the switch 250 is off in this case, the current flowing to the terminal 32e is at a relatively small value of 200 μA. Following this, when the above-stated button 22 of the camera is operated, the switch (23a and 23b) is turned on. The level of the Q output of the flip-flop 103 of FIG. 4 then becomes low. The level of the signal coming to the terminal 32b becomes low. With the signal level thus having become low, the signal inverted by the inverter 237 comes via the AND gate 235 and the OR gate 213 to the trigger circuit 210 as a rising signal. This causes the xenon discharge lamp 27 to flash with the energy of the capacitor 204. Then, the output level of the NOR gate 214 becomes low to turn off the switch 215. The photo integrating circuit "a" begins to operate to accumulate a portion of the light quantity emitted by the xenon discharge lamp 27. Further, since the switch 216 is then in its OFF position, at the integrating circuit "a", it is only the integrating capacitor 218 of small capacity that is connected to the feedback loop of the operational amplifier 220. At the same time as commencement of the integrating action, the flip-flop (F/F) 236 is set in the same manner as the trigger circuit 210. The level of the $\overline{Q}$ output of the F/F 236 changes to a high level and that of the $\overline{Q}$ output to a low level. Further, when the constant voltage is applied to the terminal 32e, the output level of the comparator 246 is low. In that instance, the F/F 236 has been released from a cleared state and is set at the same time as commencement of the integrating action mentioned above. A reflection light coming from an object to be photographed as a result of flashing by the xenon discharge lamp 27 reaches the CCD sensor 16 through an optical path which is arranged as shown in FIG. 1. The reflection light is integrated by the CCD sensor 16. The comparator 102 produces an output when the integrated value reaches the predetermined level V. The level of the $\overline{Q}$ output of the flip-flop 103 changes from a low level to a high level. The level of the signal of the terminal 32b changes from a low level to a high level. The rise of this signal causes a rising pulse to be produced at the differentiation circuit which consists of the inverter 227, the capacitor 228, the diode 229 and the resistor 230. The pulse is supplied via the OR gate 226 to the control circuit 212. This causes the xenon discharge lamp 27 to stop flashing. The pulse comes also to the clock input terminal of the latch circuit 222. The A/D converter 221 always A/D converts the integrated value of a portion of the flash light quantity of the xenon discharge lamp 27. The result of this integration is latched at the circuit 222 when the xenon discharge lamp ceases to flash. Therefore, with the reflection light coming from the object as a result of pre-flashing received by the camera, the flash light quantity emitted from the xenon discharge lamp 27 for pre-flashing is stored at the latch circuit 222 when the level of the light incident on the camera reaches a given level.

After that, when the shutter release button of the camera is pushed to its second stroke position to turn on the switch SW2 of FIG. 4, the embodiment operates as follows: The shutter travels in response to the pushing operation on the shutter release button. The X contact turns on upon completion of the travel of the leading shutter curtain. The level of the terminal 32a becomes low. Since the level of the $\overline{Q}$ output of the flip-flop 104 of FIG. 4 becomes low when the switch SW2 turns on, the output of the inverter 240 is at a high level at this point of time. The output of the AND gate 233 is, therefore, at a high level. The output level of the one-shot OS 232 becomes high. At this point of time, if the main capacitor 204 remains in a charge completion state, the output of the AND gate 231 is supplied via the OR gate 213 to the trigger circuit 210. This causes the xenon discharge lamp 27 to flash. In this instance, the X contact turns on. The switching element 259 turns on. The xenon discharge lamp 27 flashes with the energies of the capacitors 256 and 204. Further, the output level of the AND gate 242 then also becomes high to turn on the transistor 253 and to turn off the transistor 251. As a result, the amount of the current coming from the camera via the terminal 32e changes. Accordingly, by detecting this change on the side of the camera, the time at which the main flashing action is performed can be accurately detected on the side of the camera.

Concurrently with flashing by the xenon discharge lamp 27, the output level of the NOR gate 214 becomes low. The switch 215 turns off. The switch 216 turns on. Therefore, the capacity of the capacitor connected to the feedback loop of the operational amplifier 220 of the photo integrating circuit "a" becomes the sum of the capacities of the capacitors 217 and 218. The output of the photo integrating circuit "a" which is produced during the flashing process of the xenon discharge lamp 27 is supplied to the comparator 224 to be compared with the output of the D/A converter 224. When these two outputs come to coincide with each other, the output of the comparator 224 changes from a low level to a high level. The high level output of the comparator 224 is supplied to the AND gate 225. Since the switch 255 is then selecting the EFLK mode with the Q output of the F/F 236 being at a high level as mentioned above, the output level of the AND gate 225 becomes high when the output level of the comparator 224 changes. The high level output of the AND gate 225 is supplied via the OR gate 226 to the control circuit 212. As a result, the xenon discharge lamp 27 stops flashing. In this instance, since the output level of the OR gate 239 is low (the $\overline{Q}$ output of the F/F 236 is at a low level and the output level of the inverter 238 is low), the output of the AND gate 247 is also at a low level. Therefore, even when positive pulses are produced through the capacitor 243, the resistor 244 and the diode 245 with a flashing stop signal produced from the terminal 32d, the output of the AND gate 247 remains at a low level to prevent the signal from being received. In other words, in case that the flash device is in the EFLK mode, even if the flashing stop signal is produced from the camera side for bringing the flashing action of the flash device to a stop for TTL light control, the flashing action of the flash device is never brought to a stop by that signal.

In case that the TTL light control mode is selected by the switch 255; the terminal 32c is at a low level; the switch 250 is in its OFF position; and the leading shutter curtain synchronizing mode is selected, the embodiment operates as follows: Under this condition, the terminal 32c is kept at a low level by the switch 255. Therefore, the output of the AND gate 235 remains at a low level. Then, even if a signal which changes from a high level to a low level is applied to the terminal 32b with a pre-flashing switch operated on the side of the camera, such a signal is never allowed to reach the trigger circuit 210. Therefore, no pre-flashing action is performed. When the release button is pushed to its second stroke position, the switch SW2 of FIG. 4 turns on. The level of the $\overline{Q}$ output of the flip-flop 104 becomes low. Following this, the X contact turns on when the shutter travels. Therefore, the xenon discharge lamp 27 flashes in the same manner as described in the foregoing.

Further, with the switch SW2 having turned on, the CCD sensor 16 begins to perform a light quantity integrating action on the light flux incident thereon coming via the optical path shown in FIG. 2. When the output AGC of the CCD sensor 16 reaches the reference level Vref, the comparator 105 produces an output which causes the level of the $\overline{Q}$ output of the flip-flop 104 to become high. This signal of the flip-flop 104 is supplied to the terminal 32d of the flash device. The change in the level of this signal is detected through the capacitor 243, the resistor 244 and the diode 245. A pulse signal is then supplied to the AND gate 247. The pulse signal is thus transmitted via the AND gate 247 and the OR gate 226 to the control circuit 212 to bring thereby the flashing action of the discharge lamp 27 to a stop. The flash light quantity control according to the light reflected by the film surface is accomplished in this matter.

With regard to the output AGC of the CCD sensor of this embodiment, i.e. the light quantity integration output of the CCD sensor to be used for controlling the accumulating time of the CCD sensor, the output of some of a plurality of picture elements which are provided for obtaining focus information may be used for the control over the accumulating time in the same manner as in the conventional AF system; or the output of a sensor arranged separately from these picture elements to determine the accumulating time of these picture elements may be utilized for the control over the accumulating time of the CCD sensor.

In accordance with this invention, as described in the foregoing, the integrating or accumulating action on the quantity of a light flux resulting from flashing is accomplished by means of the output AGC of the AF sensor, so that the AF sensor can be arranged to serve also as a sensor for control over the quantity of flashing light.

What is claimed is:

1. A camera system comprising:
   (a) a camera having
      (I) an AF sensor arranged to receive a light flux coming through a lens for the purpose of automatic focusing and producing an output indicative of such received light flux, and
      (II) means operable to select a pre-flasing mode or a main flashing mode for said camera; and
   (b) a flash unit including
      (I) circuit means for establishing a flashing light quantity for said flash unit in said main flashing mode in accordance with the output of said AF sensor produced on the basis of light reflected to said AF sensor from an object to be photographed as a result of flashing occurring in said pre-flashing mode.

2. A camera system according to claim 1, wherein said flash unit is arranged to perform pre-flashing prior to main flashing; said AF sensor is arranged to integrate the quantity of an incident light flux resulting from said pre-flashing; said circuit means is arranged to detect the integration quantity integrated by said AF sensor; and said flash unit includes a first circuit which is arranged to obtain the light quantity of pre-flashing from the integration quantity detected by said circuit means and a second circuit which is arranged to control the light quantity of said main flashing on the basis of the pre-flashing light quantity obtained by said first circuit.

3. A camera comprising:
   (a) an AF sensor arranged to receive a light flux coming through a lens for the purpose of carrying out an automatic focusing operation and producing an output indicative of such received light flux;
   (b) means operable to select a pre-flashing mode or a main flashing mode for said camera; and
   (b) circuit means responsive to said output of said AF sensor for generating first and second signals for respective use in controlling the quantities of flashing light of a flash unit in said pre-flashing and main flashing modes.

4. A camera according to claim 3, wherein said flash unit is arranged to perform pre-flashing prior to main flashing; said AF sensor is arranged to integrate the quantity of an incident light flux resulting from said pre-flashing; said circuit means is arranged to detect the integration quantity integrated by said AF sensor; and said flash unit includes a first circuit which is arranged to obtain the light quantity of pre-flashing from the integration quantity detected by said circuit means and a second circuit which is arranged to control the light quantity of said main flashing on the basis of the pre-flashing light quantity obtained by said first circuit.

5. A camera system or a camera according to claims 1 or 3 wherein said AF sensor is of a light quantity integrating type; and said camera circuit means is operative on the basis of a period of time elapsed before the light quantity output of said AF sensor reaches a predetermined value.

6. A camera system comprising:
   (a) a camera having
      (I) an AF sensor arranged to receive a light flux coming through a lens for the purpose of automatic focusing and producing an output indicative of such received light flux,
      (II) means operable to select a pre-flashing mode or a main flashing mode for said camera, and
      (III) circuit means responsive to said output of said AF sensor for generating first and second signals for respective use in controlling the quantities of flashing light of a flash unit in said pre-flashing and main flashing modes; and
   (b) a flash unit including
      (I) circuit means for establishing a flashing light quantity for said flash unit in said main flashing mode in accordance with the output of said AF sensor produced on the basis of light reflected to said AF sensor from an object to be photographed as a result of flashing occurring in said pre-flashing mode.

7. A camera system composed of a camera having an AF sensor arranged to receive a light flux coming through a lens for the purpose of automatic focusing and a flash unit, comprising:
   (a) circuit means arranged to adjust, in a main flashing mode, the flashing light quantity of said flash unit according to the output of said AF sensor which is produced on the basis of a reflection light received from an object to be photographed as a result of pre-flashing by said flash unit; and
   (b) selecting means for selecting said flashing mode, wherein said flash unit is arranged to perform pre-flashing prior to main flashing; said AF sensor is arranged to integrate the quantity of an incident light flux resulting from said pre-flashing; and said circuit means is arranged to detect the light quantity of said pre-flashing from the integrated quantity of said light flux and to adjust light quantity for main flashing according to the detected light quantity of said pre-flashing when said flash unit is performing said main flashing.

* * * * *